United States Patent
Jang et al.

(10) Patent No.: US 9,392,510 B2
(45) Date of Patent: Jul. 12, 2016

(54) HANDOVER METHOD AND APPARATUS IN WIRELESS COMMUNICATION SYSTEM

(71) Applicant: Samsung Electronics Co., Ltd., Suwon-si, Gyeonggi-do (KR)

(72) Inventors: Jae Hyuk Jang, Suwon-si (KR); Himke Van Der Velde, Staines (GB); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/360,047

(22) PCT Filed: Jan. 9, 2013

(86) PCT No.: PCT/KR2013/000181
§ 371 (c)(1),
(2) Date: May 22, 2014

(87) PCT Pub. No.: WO2013/105786
PCT Pub. Date: Jul. 18, 2013

(65) Prior Publication Data
US 2014/0287726 A1    Sep. 25, 2014

Related U.S. Application Data

(60) Provisional application No. 61/584,744, filed on Jan. 9, 2012, provisional application No. 61/591,385, filed on Jan. 27, 2012.

(51) Int. Cl.
*H04M 1/66* (2006.01)
*H04W 36/00* (2009.01)
(Continued)

(52) U.S. Cl.
CPC .......... *H04W 36/0083* (2013.01); *H04W 12/02* (2013.01); *H04W 12/10* (2013.01); *H04W 36/0055* (2013.01); *H04W 36/04* (2013.01); *H04W 84/045* (2013.01)

(58) Field of Classification Search
CPC ..... H04W 12/10; H04W 12/04; H04W 36/02; H04W 56/00; H04L 63/068; H04L 33/50
See application file for complete search history.

(56) References Cited

U.S. PATENT DOCUMENTS 6,925,298 B2 * 8/2005 Ho ........................ H04W 76/02
                                                                380/247
7,054,630 B2 * 5/2006 Nagpal ............. H04W 52/0229
                                                                340/7.32
(Continued)

FOREIGN PATENT DOCUMENTS

KR    10-2010-0105449 A    9/2010
KR    10-2011-0039378 A    4/2011
KR    10-2011-0093613 A    8/2011

OTHER PUBLICATIONS

3GPP; 3GPP TS 36.331 V10.4.0; 3rd Generation Partnership Project; Technical Specification Group Radio Access Network; Evolved Universal Terrestrial Radio Access (E-UTRA); Radio Resource Control (RRC); Protocol specification (Release 10), Dec. 22, 2011.

(Continued)

*Primary Examiner* — Mahendra Patel
(74) *Attorney, Agent, or Firm* — Jefferson IP Law, LLP

(57) ABSTRACT

The present disclosure provides a method for correcting an error caused by Hyper Frame Number (HFN) and Packet Data Convergence Protocol Sequence Number (PDCP SN) mismatch between a user equipment and base station when the user equipment fails in handover between cells in a wireless communication system. In addition, the present disclosure provides a handover procedure for a user equipment performing handover from a macro cell to a Closed Subscriber Group (CSG) cell shared by multiple operators in a wireless communication system. The present disclosure enables a user equipment and base station to perform communication without a malfunction after handover failure. For handover from a macro cell to a CSG cell shared by multiple operators, the present disclosure enables a user equipment to perform handover to an accessible cell.

10 Claims, 13 Drawing Sheets

(51) Int. Cl.
  *H04W 12/10*     (2009.01)
  *H04W 12/02*     (2009.01)
  *H04W 36/04*        (2009.01)
  *H04W 84/04*        (2009.01)

(56) References Cited

U.S. PATENT DOCUMENTS

| | | | | |
|---|---|---|---|---|
| 7,068,636 B2 * | 6/2006 | Kuo | .................. | H04W 36/12 370/338 |
| 8,208,498 B2 * | 6/2012 | Kitazoe | ................ | H04W 12/04 370/235 |
| 8,442,233 B2 * | 5/2013 | Mildh | .................. | H04L 9/0844 380/272 |
| 2009/0316904 A1 * | 12/2009 | Klingenbrunn | ......... | H04L 47/10 380/274 |
| 2010/0265912 A1 * | 10/2010 | Mildh | ................ | H04W 56/001 370/331 |
| 2012/0099525 A1 * | 4/2012 | Maheshwari | ................ | 370/328 |

OTHER PUBLICATIONS

Mediatek Inc., Impact on handover with PDCP SN change, 3GPP TSG RAN WG2 Meeting #79, R2-123592, Aug. 7, 2012, Qingdao, China.

ZTE, Some small corrections to 36.300, 3GPP TSG-RAN WG2 Meeting #74, R2-113388, May 10, 2011, Barcelona, Spain.

Samsung, RRC TP on CA changes regarding Connection control, 3GPP TSG-RAN2#70 bis meeting, R2-103802, Jun. 22, 2010, Stockholm, Sweden.

* cited by examiner

FIG. 4

| HFN (401) | PDCP SN (403) |

HANDOVER METHOD AND APPARATUS IN WIRELESS COMMUNICATION SYSTEM

TECHNICAL FIELD

The present disclosure relates to a wireless communication system. More particularly, the present disclosure relates to a handover method for a user equipment in the Long Term Evolution (LTE) system.

BACKGROUND ART

Recent advances in wireless communication technologies have enabled rapid evolution of communication system technologies. Among these, the LTE system has attracted much attention as a fourth generation mobile communication technology. The LTE system not only supports basic handover between cells having been supported by previous generation communication technologies but also supports handover in a variety of scenarios.

For example, the LTE system supports recovery from failure in a handover attempt. The LTE system also supports handover between heterogeneous cells. Here, heterogeneous cells may include a macro cell covering a wide area, a picocell covering a small area, and a closed subscriber group (CSG) cell to which only a specific group of subscribers are allowed to connect.

First, consider a case where a user equipment fails in handover. Several options are available when the user equipment performs handover from a source cell to a target cell. For example, after handover not involving full configuration option, the user equipment in the target cell may use settings most inherited from those settings configured in the source cell. After handover involving full configuration option, the user equipment in the target cell may have to newly configure all settings. The full configuration option applies when it is difficult for the target cell to inherit settings from the source cell. The user equipment may determine whether to reset existing parameters according to the above two options.

Meanwhile, when a handover command with the full configuration option is received from the source cell, the user equipment may reset existing parameters. Thereafter, owing to handover failure, the user equipment may have to return to the source cell and perform connection reestablishment and reconfiguration by reuse of the existing parameters. However, as the existing parameters have been reset, they may be not reusable. This is a problem to be addressed.

Second, consider a case where a user equipment performs handover from a source macro cell to a target CSG cell. As a special group of subscribers are allowed to access a CSG cell, to hand over a user equipment to the CSG cell, the network should be able to determine whether the user equipment is a member of the CSG cell. To this end, in the exiting procedure, when a user equipment reports signal measurement results to the source cell, the user equipment reports the CSG ID of a measured cell and a CSG member indication indicating whether the user equipment is a member of the measured CSG cell.

The above procedure is applicable when the target CSG cell is operated by a single operator. However, in the case wherein the target CSG cell is operated by multiple operators, the scheme to report the operator to which the target CSG cell belongs is not specified. This is another problem to be addressed.

DISCLOSURE OF INVENTION

Technical Problem

Aspects of the present disclosure are to address at least the above mentioned problems. Accordingly, an aspect of the present disclosure is to provide operation methods that enable a user equipment and the network to handle handover failure or handover to a shared CSG cell in a wireless mobile communication system.

Solution of Problem

A first embodiment of the present disclosure proposes a method for recovering a parameter used in relation with a source cell when connection to the source cell is reestablished after the user equipment fails in handover involving full configuration option. Here, the parameter corresponds to the COUNT used as input for encryption and integrity verification, and the COUNT value corresponds to the value of Hyper Frame Number (HFN) combined with Packet Data Convergence Protocol Sequence Number (PDCP SN).

A second embodiment of the present disclosure proposes a method for utilizing operator IDs to determine the target cell in the case of handover to a CSG cell shared by multiple operators. When a user equipment reports neighbor cell measurement results to the source cell, if the target cell is managed by multiple operators, the user equipment may also report IDs of the operators permitting access to the target cell.

More specifically, in accordance with an aspect of the present disclosure, a method of handover control for a user equipment in a wireless communication system is provided. The method may include: receiving an RRC connection reconfiguration message is received from a source cell; determining whether a full configuration option is configured in the received RRC connection reconfiguration message; storing, when the full configuration option is configured, the current value of a designated parameter used in connection with the source cell, and resetting the parameter; and performing encryption and integrity verification using the reset parameter.

In accordance with another aspect of the present disclosure, a user equipment supporting handover control in a wireless communication system is provided. The user equipment may include: a transceiver unit to send and receive signals to and from a source cell or a target cell; and a control unit to control a process of determining, upon reception of an RRC connection reconfiguration message from the source cell, whether a full configuration option is configured in the received RRC connection reconfiguration message, storing, when the full configuration option is configured, the current value of a designated parameter used in connection with the source cell and resetting the parameter, and performing encryption and integrity verification using the reset parameter.

Advantageous Effects of Invention

In a feature of the present disclosure, by use of the provided method, a user equipment and base station may perform communication without a malfunction after handover failure. For handover from a macro cell to a CSG cell shared by multiple operators, it is possible for a user equipment to perform handover to an accessible cell.

BRIEF DESCRIPTION OF DRAWINGS

FIG. 4 illustrates a format for the COUNT value.

MODE FOR THE INVENTION

Hereinafter, embodiments of the present disclosure are described in detail with reference to the accompanying drawings. Detailed descriptions of well-known functions and structures incorporated herein may be omitted to avoid obscuring the subject matter of the present disclosure.

Figure 1:
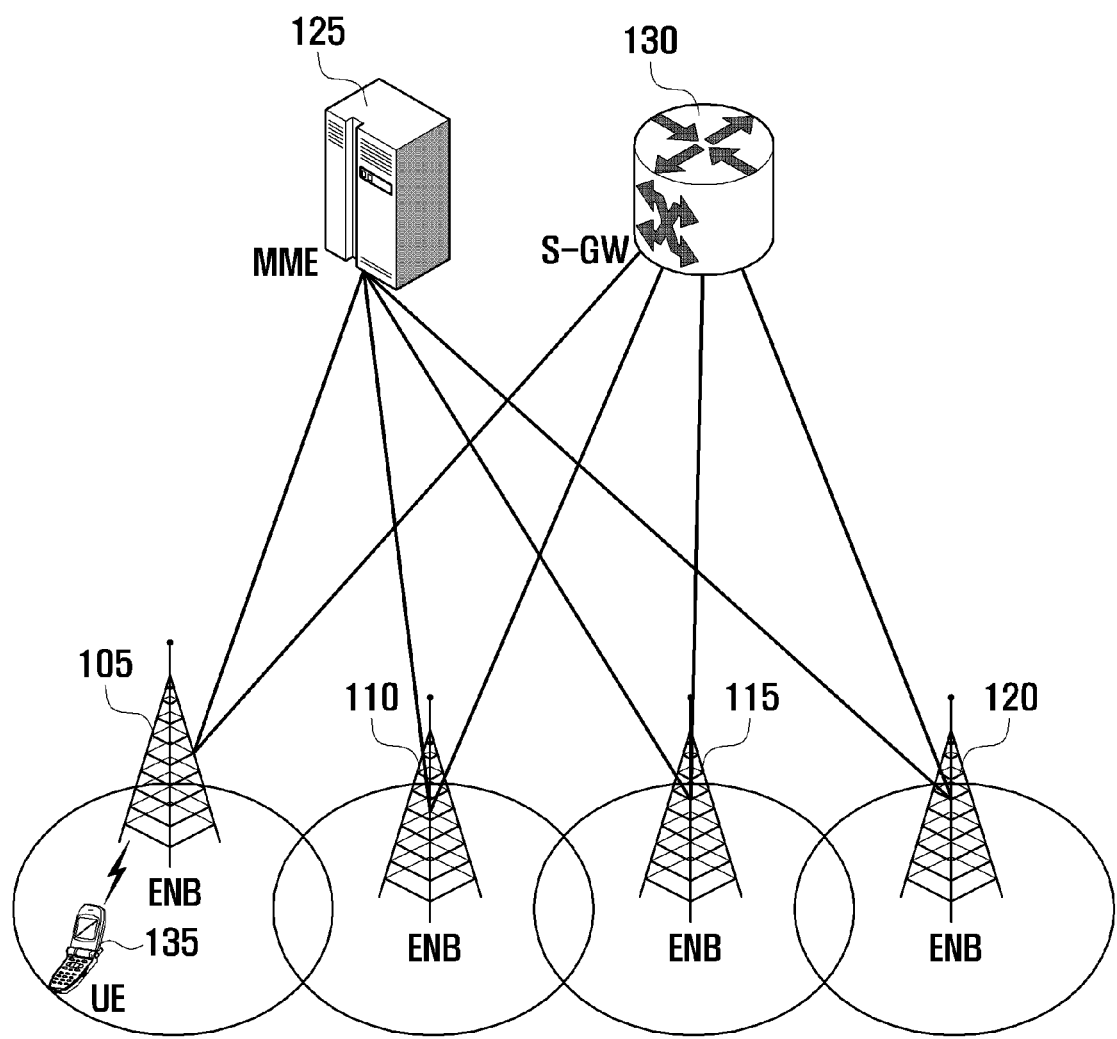
FIG. 1 illustrates the architecture of the LTE system, to which the present disclosure is applied.

FIG. 1 illustrates the architecture of the LTE system, to which the present disclosure is applied.

Referring to FIG. 1, the radio access network of the LTE system is composed of Evolved Node Bs (ENB, Node B or base station) 105, 110, 115 and 120, Mobility Management Entity (MME) 125, and Serving Gateway (S-GW) 130. A user equipment (UE or terminal) 135 may connect to an external network through the ENBs 105 to 120 and the S-GW 130.

In FIG. 1, the ENBs 105 to 120 correspond to Node Bs of the existing UMTS system. The ENB is connected to the UE 135 through a radio channel, and may perform more complex functions in comparison to the existing Node B. In the LTE system, as all user traffic including real-time services like Voice over IP (VoIP) services is served by shared channels, an entity is needed to perform scheduling on the basis of status information collected from UEs such as information on buffer states, available transmit power and channels. Each of the ENBs 105 to 120 performs this scheduling function. In most cases, a single ENB controls multiple cells. To achieve a data rate of 100 Mbps, the LTE system utilizes Orthogonal Frequency Division Multiplexing (OFDM) in, for example, a 20 MHz bandwidth as radio access technology. Adaptive modulation and coding (AMC) is employed to determine the modulation scheme and channel coding rate according to UE channel states. The S-GW 130 provides data bearers, and creates and releases a data bearer under control of the MME 125. The MME 125 performs various control functions including UE mobility management and is connected to multiple ENBs.

Figure 2:
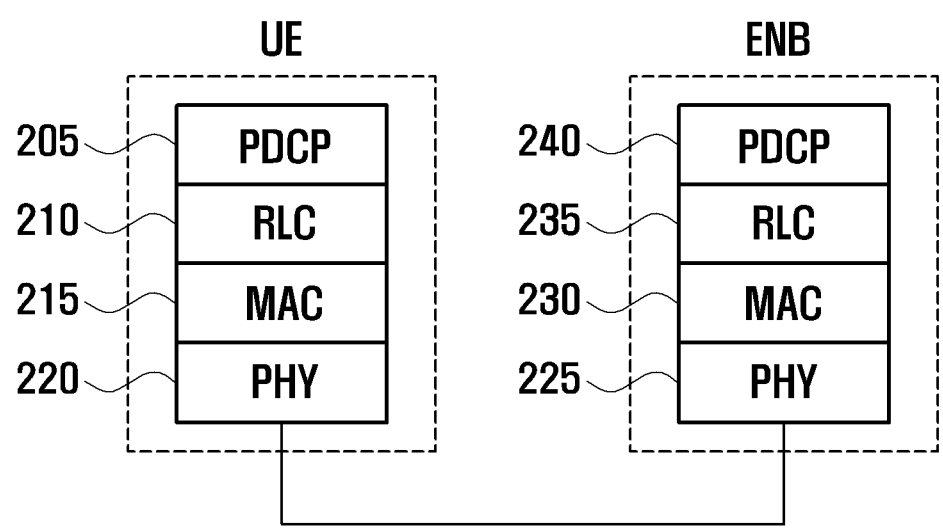
FIG. 2 illustrates a hierarchy of wireless protocols in the LTE system, to which the present disclosure is applied.

FIG. 2 illustrates a hierarchy of wireless protocols in the LTE system, to which the present disclosure is applied.

Referring to FIG. 2, for a UE and ENB in the LTE system, the wireless protocol stack is composed of Packet Data Convergence Protocol (PDCP) 205 or 240, Radio Link Control (RLC) 210 or 235, Medium Access Control (MAC) 215 or 230, and a physical layer (PHY) 220 or 225. The PDCP 205 or 240 performs compression and decompression of IP headers. The RLC 210 or 235 reconfigures PDCP PDUs (Protocol Data Unit) to a suitable size. The MAC 215 or 230 is connected to multiple RLC layer entities in the same UE, and multiplexes RLC PDUs into MAC PDUs or demultiplexes MAC PDUs into RLC PDUs. The physical layer 220 or 225 converts higher layer data into OFDM symbols by means of channel coding and modulation and transmits the OFDM symbols through a wireless channel, or converts OFDM symbols received through a wireless channel into higher layer data by means of demodulation and channel decoding and forwards the data to higher layers. For additional error correction, hybrid ARQ (HARQ) is used in the physical layer, and the receiving end sends 1-bit HARQ ACK/NACK information indicating whether a packet transmitted by the transmitting end is successfully received. Downlink HARQ ACK/NACK information as to uplink transmission may be sent through Physical Hybrid-ARQ Indicator Channel (PHICH), and uplink HARQ ACK/NACK information as to downlink transmission may be sent through Physical Uplink Control Channel (PUCCH) or Physical Uplink Shared Channel (PUSCH).

Figure 3:
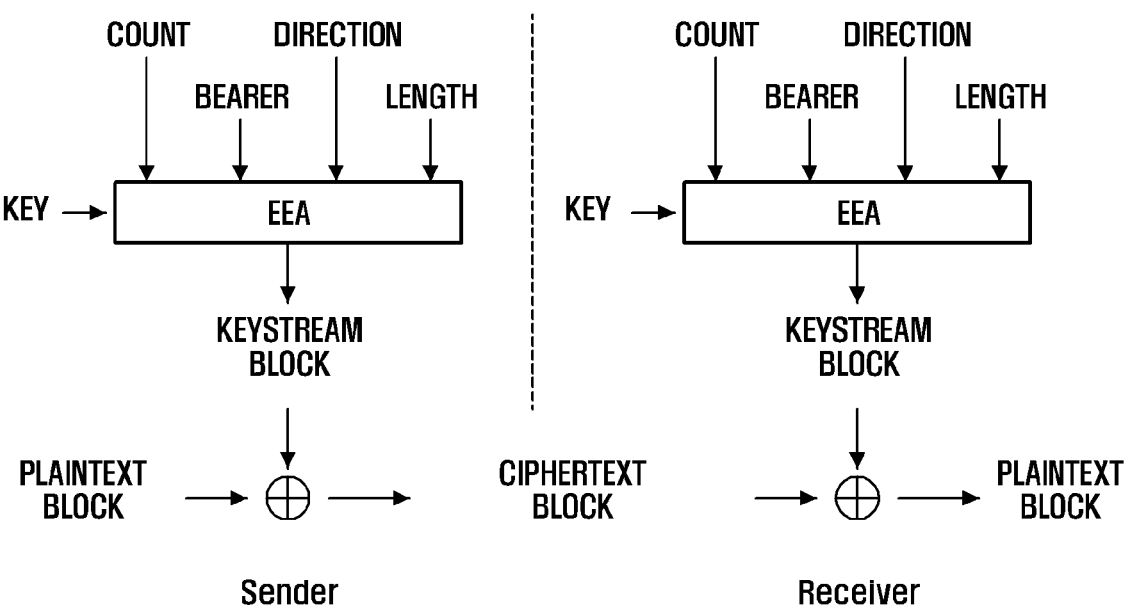
FIG. 3 illustrates data encryption and decryption in the LTE system.

FIG. 3 illustrates data encryption and decryption in the LTE system.

At the transmitting end, input parameters described below are fed to the EPS Encryption Algorithm (EEA) to generate a keystream block.

KEY: 128-bit encryption key
COUNT: 32-bit counter composed of HFN+PDCP SN (refer to FIG. 4)
    HFN size is given by 32—PDCP SN length
    PDCP SN length is set through Radio Resource Control (RRC) layer message
BEARER: 5-bit bearer identity
DIRECTION: 1-bit direction of transmission (uplink: 0, downlink: 1)
LENGTH: length of keystream required A generated keystream block is added bitwise to a plaintext block to be actually sent to thereby generate a ciphertext block, and the ciphertext block is sent to the receiving end.

At the receiving end, a keystream block is generated in the same manner described above, and the keystream block is added bitwise to the received ciphertext block to thereby recover the plaintext block to be actually received.

Figure 4:
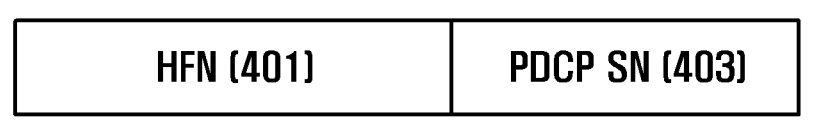

FIG. 4 illustrates a format for the COUNT value used as input for keystream block generation. As shown in FIG. 4, the COUNT value is composed of a HFN 401 and a PDCP SN 403.

Figure 5:
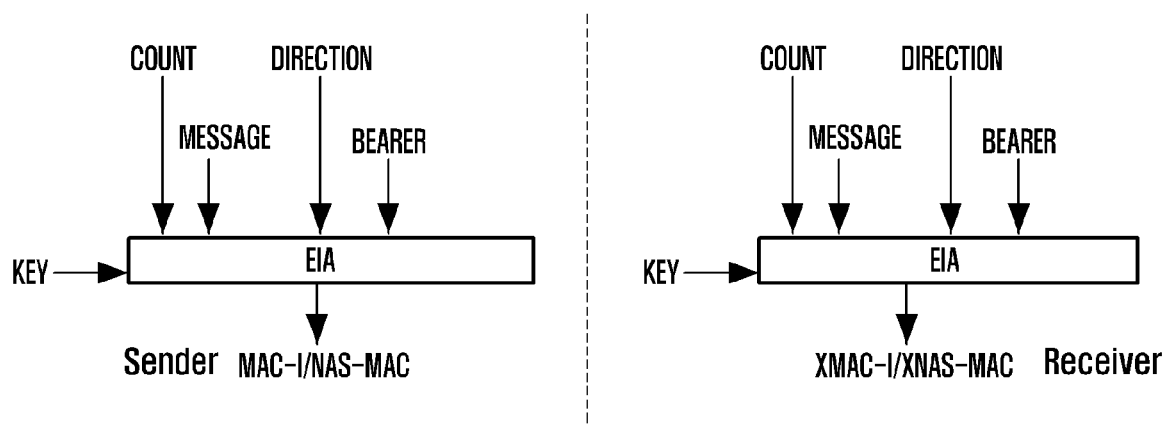
FIG. 5 illustrates integrity verification of data in the LTE system.

FIG. 5 illustrates integrity verification of data in the LTE system.

At the transmitting end, input parameters described below are fed to the EPS Integrity Algorithm (EIA) to generate a message authentication code (MAC-I: Message Authentication Code for Integrity or NAS-MAC: Message Authentication Code for NAS for Integrity).

KEY: 128-bit encryption key
COUNT: 32-bit counter composed of HFN+PDCP SN (refer to FIG. 4)
    HFN size is given by 32—PDCP SN length
    PDCP SN length is set through RRC layer message BEARER: 5-bit bearer identity
DIRECTION: 1-bit direction of transmission (uplink: 0, downlink: 1)
MESSAGE: data to be sent The 32-bit message authentication code (MAC-I/NAS-MAC) is appended to the data to be sent when transmitted.

At the receiving end, an expected message authentication code (XMAC-I/XNAS-MAC) is computed on the received message in the same way described above, and the expected message authentication code (XMAC-I/XNAS-MAC) is compared with the received message authentication code (MAC-I/NAS-MAC) for integrity verification.

The COUNT value is used for both encryption described in FIG. 3 and integrity verification described in FIG. 5. The COUNT value may be reset or not reset according to commands from the network.

Figure 6:
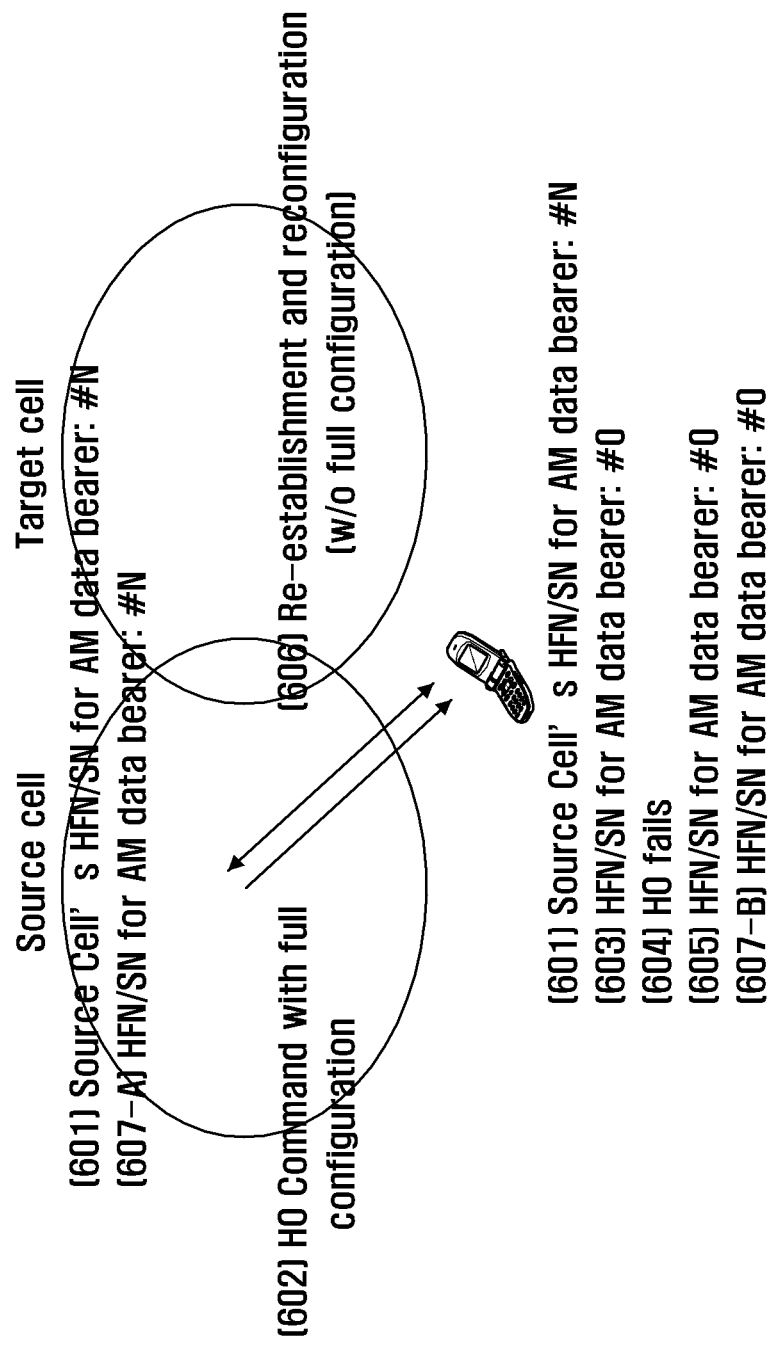
FIG. 6 illustrates a scenario to which the proposal of the present disclosure is applicable.

FIG. 6 illustrates a scenario to which the proposal of the present disclosure is applicable.

In FIG. 6, at operation 601, the source cell and the UE set the COUNT value (i.e. HFN+PDCP SN) to N for a data bearer of Acknowledged Mode (AM) (in AM mode, the receiving end sends feedback to the transmitting end so that packet retransmission is initiated upon packet reception failure). Here, the transmitting and receiving ends may perform encryption and integrity verification according to the schemes described in connection with FIGS. 3 and 5.

At operation 602, the network issues a handover command according to a signal measurement report from the UE. Here, the handover command message contains the fullConfig-r9 field set to TRUE, notifying application of the full configuration option.

In the event that the full configuration option is applied, when a malfunction is detected between the UE and eNB or it is necessary to reconfigure all connections therebetween, the eNB may compel the UE to reconfigure all dedicated radio configurations except for C-RNTI (UE identity within eNB) and security settings after releasing or removing the same.

When the full configuration option is not configured in the handover command, as described in FIG. 5, both the UE and the eNB maintain the COUNT value upon handover. This is to support PDCP level ARQ after handover.

When the full configuration option is configured in the handover command, both the UE and the eNB reset the COUNT value upon handover. In this case, PDCP level ARQ is not supported.

Upon reception of the handover command message, at operation 603, the UE resets the COUNT value to 0.

At operation 604, the UE makes an attempt for handover to a cell indicated by the handover command but fails in handover.

At operation 605, the COUNT value of the UE is still 0.

Thereafter, at operation 606, as the signal state of the source cell becomes better, the UE performs connection reestablishment with the source cell and then performs connection reconfiguration. Here, the source cell does not configure the full configuration option at the time of connection reestablishment.

Consequently, whereas the COUNT value used by the source cell is N (last used value), the COUNT value used by the UE is 0 (value after reset), causing failure in encryption and integrity verification.

Figure 7:
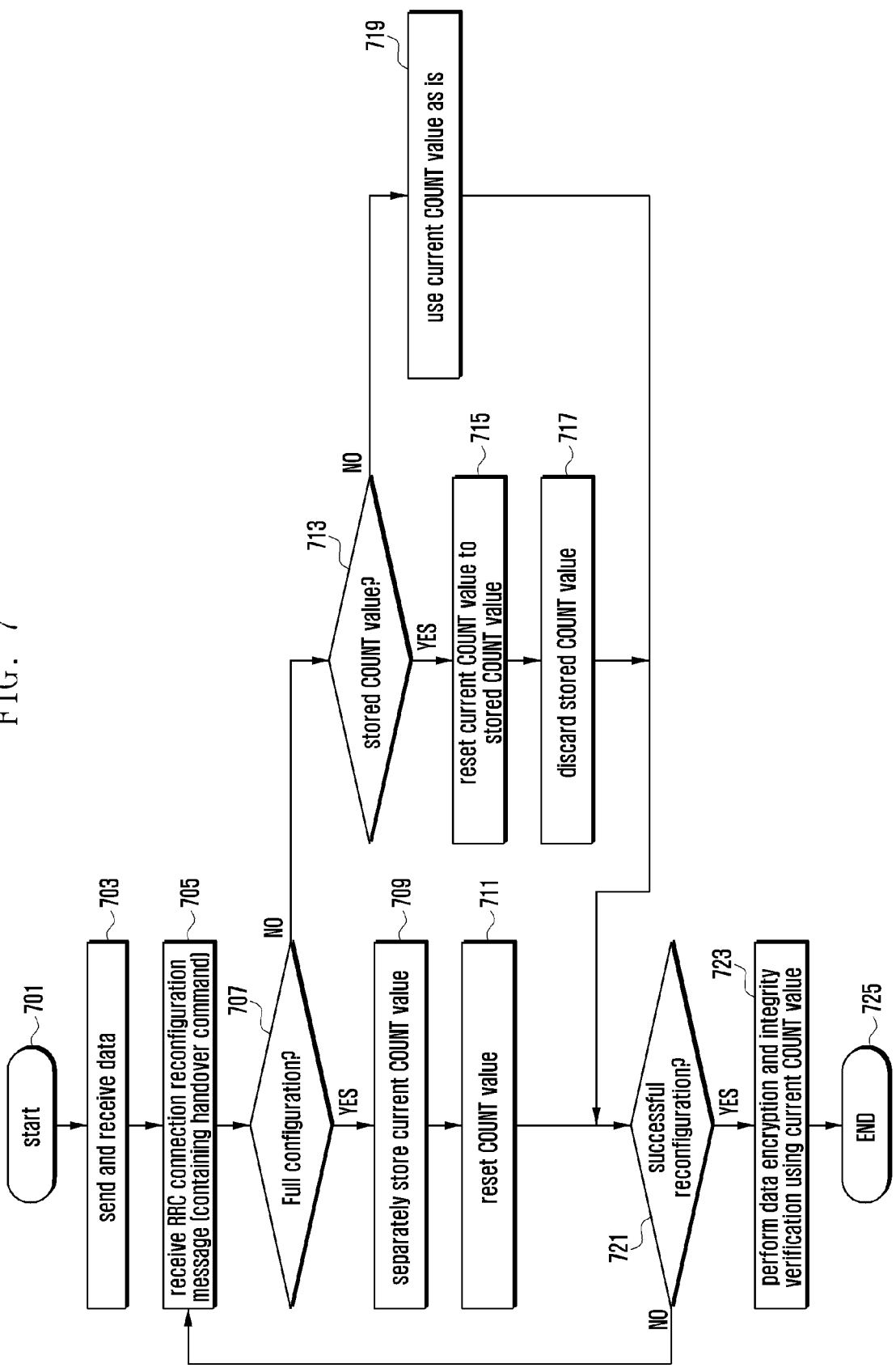
FIG. 7 is a flowchart of a procedure performed by a user equipment to prevent malfunction upon handover failure according to the present disclosure.

FIG. 7 is a flowchart of a procedure performed by a user equipment to prevent malfunction upon handover failure according to the present disclosure.

At operation 703, the UE sends and receives data to and from the eNB. Here, the UE and eNB maintain the corresponding COUNT values.

Thereafter, at operation 705, the UE receives an RRC connection reconfiguration message containing a handover command from the eNB.

Upon reception of the RRC connection reconfiguration message containing a handover command, at operation 707, the UE determines whether the full configuration option is configured in the received message.

If the full configuration option is configured, the UE proceeds to operation 709 at which the UE stores the current COUNT value in a separate location. At operation 711, the UE resets the COUNT value to 0.

That is, the UE determines to perform encryption and integrity verification using the newly set COUNT value.

If the full configuration option is not configured, the UE proceeds to operation 713 at which the UE determines whether a previous COUNT value is stored in the separate location. If a previous COUNT value is stored in the separate location, the UE proceeds to operation 715 at which the UE resets the current COUNT value to the stored COUNT value. At operation 717, the UE determines to perform encryption and integrity verification using the newly set COUNT value and discards the COUNT value stored in the separate location.

If a previous COUNT value is not stored in the separate location, the UE proceeds to operation 719 at which the UE determines to use the current COUNT value for encryption and integrity verification.

Thereafter, at operation 721, the UE checks whether RRC connection reconfiguration (or handover) is successfully performed. If RRC connection reconfiguration is successfully performed, the UE proceeds to operation 723 at which the UE performs encryption and integrity verification using the current COUNT value.

If RRC connection reconfiguration is not successfully performed (i.e. handover failure), the UE returns to operation 705 through connection reestablishment and reconfiguration. That is, the UE performs encryption using the COUNT value stored in the separate location.

Next, a description is given of UE operations described in FIG. 7 when the scenario described in FIG. 6 is applied. When a handover command is received initially (operation 705), as the full configuration option is configured (operation 707), the UE stores the current COUNT value in the separate location (operation 709) and resets the COUNT value to 0 (operation 711).

However, when handover fails (operation 721), for connection reestablishment with the source cell, the UE newly receives an RRC connection reconfiguration message from the source cell (operation 705). As the full configuration option is not configured in the received RRC connection reconfiguration message (operation 707), the UE checks whether a COUNT value is stored in the separate location (operation 713).

As a COUNT value is stored in the separate location, the UE resets the current COUNT value to the stored COUNT value (operation 715) and discards the COUNT value stored in the separate location (operation 717). After successful connection reconfiguration (operation 721), the UE performs encryption and integrity verification using the current COUNT value (operation 723).

Hereinafter, a description is given of a handover procedure for a user equipment making a handover attempt from a macro cell to a CSG cell shared by multiple operators in a wireless communication system.

Figure 8:
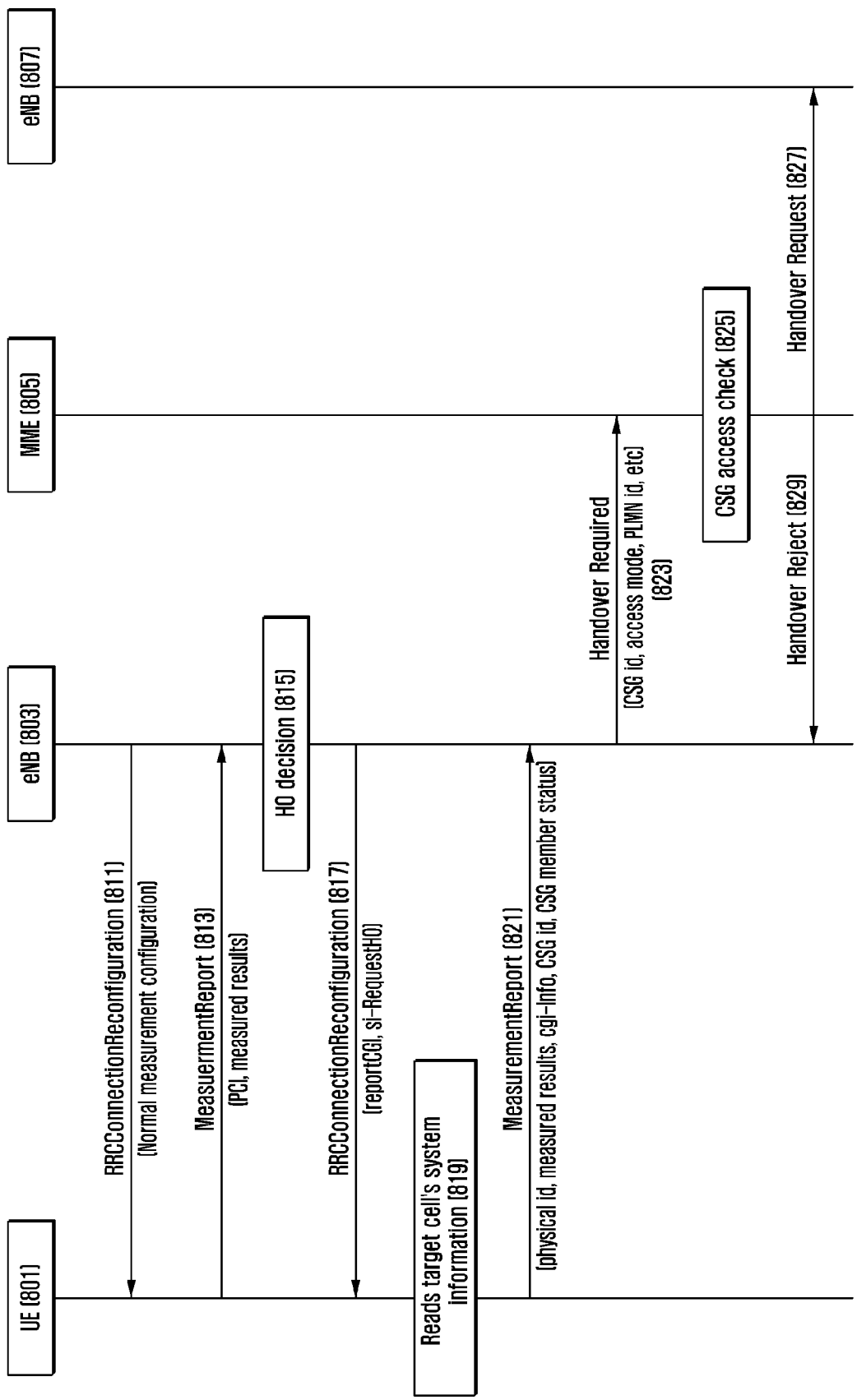
FIG. 8 illustrates message flows in the case wherein a user equipment performs handover from a macro cell to an unshared CSG cell.

FIG. 8 is a sequence diagram illustrating message flows in the case wherein a user equipment performs handover from a macro cell to an unshared CSG cell.

The present drawing serves as a background description for handover to a shared CSG cell, which is the subject matter of the present disclosure. Currently, for handover to a CSG cell shared by multiple operators, the defined procedure lacks a scheme to specify a particular operator upon handover to such a cell.

For ease of description, a handover scenario involving the Mobility Management Entity (MME) is depicted.

In FIG. 8, at operation 811, the source eNB 803 sends an RRC connection reconfiguration message containing a measurement configuration to the UE 801, so that the UE 801 may measure neighbor cells. Here, the measurement configuration may specify frequencies to be measured, measurement conditions, and reporting schemes.

At operation 813, the UE 801 performs measurement on neighbor cells according to the measurement configuration and sends a measurement report containing measured Physical Cell Identities (PCIs) and associated measurement results to the eNB 803.

Upon reception of the measurement report, at operation 815, the eNB 803 checks whether to hand over the UE 801 to another eNB on the basis of the measurement results.

When the received PCI is the PCI of a CSG cell and additional measurement is needed, at operation 817, the source eNB 803 sends an RRC connection reconfiguration message containing the reportCGI field and the si-RequestForHO field to the UE 801. Here, the reportCGI field causes the UE to obtain Cell Global Identity (CGI) and CSG information of a neighbor cell for CGI reporting, and the si-RequestForHO field allows the UE to use autonomous gaps in acquiring system information from the neighbor cell.

Upon reception of the message, at operation 819, the UE 801 receives system information of neighbor cells.

At operation 821, the UE 801 sends a measurement report containing the obtained system information to the eNB. Here, the measurement report may contain a PCI, associated measurement results, and corresponding CGI information (including Evolved Cell Global Identity (ECGI), tracking area code (TAC) used for paging, and the like). When the target cell is a CSG cell, the CSG ID and CSG member indication may also be contained in the measurement report.

Upon reception of the measurement report, at operation 823, the source eNB 803 sends a Handover Required message indicating necessity of UE handover to the MME 805. Here, when the target cell is a CSG cell, the above message contains the CSG ID of the target cell. Upon reception of the Handover Required message, at operation 825, the MME 805 determines whether the UE 801 is a member of the target cell 807. Upon determining that the UE 801 is not a member of the target cell, at operation 829, the MME 805 sends a Handover Reject message to the source eNB 803. Upon determining that the UE 801 is a member of the target cell, at operation 827, the MME 805 sends a Handover Request message for UE handover to the target cell (through the target MME).

Figure 9:
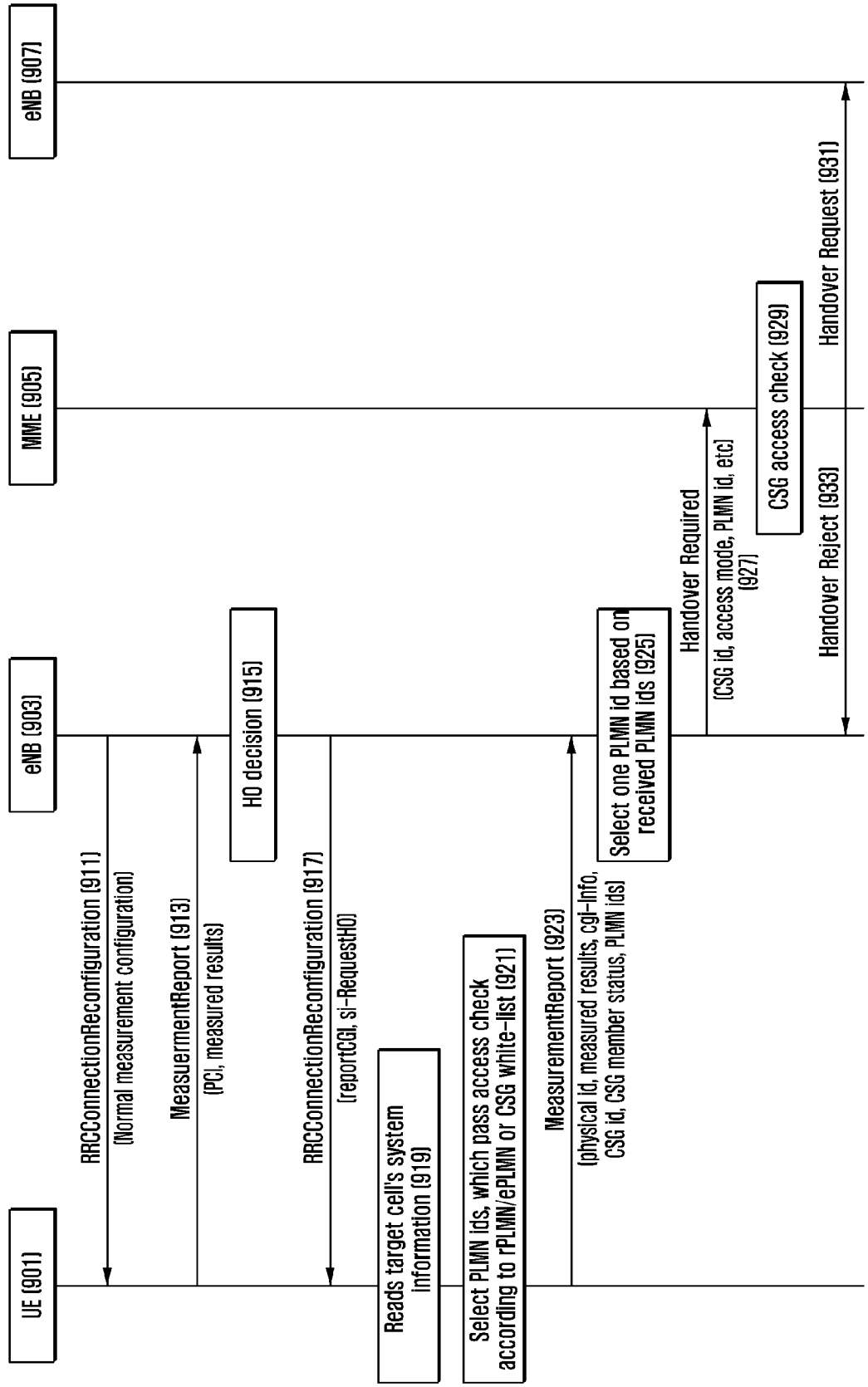
FIG. 9 illustrates message flows in the case wherein a user equipment performs handover from a macro cell to a CSG cell shared by multiple operators according to the present disclosure.

FIG. 9 is a sequence diagram, as an extended version of that of FIG. 8, illustrating message flows in the case wherein a user equipment performs handover from a macro cell to a CSG cell shared by multiple operators according to the present disclosure.

For ease of description, a handover scenario involving the MME is depicted.

In FIG. 9, at operation 911, the source eNB 903 sends an RRC connection reconfiguration message containing a measurement configuration to the UE 901, so that the UE 901 may measure neighbor cells. Here, the measurement configuration may specify frequencies to be measured, measurement conditions, and reporting schemes.

At operation 913, the UE 901 performs measurement on neighbor cells according to the measurement configuration and sends a measurement report containing measured PCIs and associated measurement results to the eNB 903.

Upon reception of the measurement report, at operation 915, the eNB 903 checks whether to hand over the UE 901 to another eNB on the basis of the measurement results.

When the received PCI is the PCI of a CSG cell and additional measurement is needed, at operation 917, the source eNB 903 sends an RRC connection reconfiguration message containing the reportCGI field and the si-RequestForHO field to the UE 901. Here, the reportCGI field causes the UE to obtain CGI and CSG information of a neighbor cell for CGI reporting, and the si-RequestForHO field allows the UE to use autonomous gaps in acquiring system information from the neighbor cell.

Upon reception of the message, at operation 919, the UE 901 receives system information of neighbor cells.

At operation 921, when a measured neighbor cell is a CSG cell shared by multiple operators, the UE refers to stored a Registered Public Land Mobile Network (rPLMN) ID, Equivalent PLMN (ePLMN) ID, or CSG whitelist and selects a PLMN ID (or PLMN ID list) permitting handover (or access). Here, the PLMN indicates a network operator. For example, assume that the UE is connected to the source cell managed by operator C and the target cell is on the whitelist of the UE and is shared by operators A, B and C. Then, the UE may select 'C' as a PLMN ID, which is then reported as part of target cell measurement results.

At operation 923, the UE 901 sends a measurement report containing the obtained system information to the eNB. Here, the measurement report may contain a PCI, associated measurement results, and corresponding CGI information. When the target cell is a CSG cell, the CSG ID and CSG member indication may also be contained in the measurement report. In particular, when the CSG cell is a shared one, a PLMN ID (or PLMN ID list) selected at operation 921 may be further contained in the measurement report.

Upon reception of the measurement report, at operation 925, if UE handover is needed, the source eNB 903 creates a Handover Required message to be sent to the MME 905. Here, when the target cell is a CSG cell, the CSG ID of the target cell is inserted into the Handover Required message. When the target cell is a CSG cell shared by multiple operators and a PLMN ID list is received from the UE, one PLMN ID is selected from the PLMN ID list and inserted into the Handover Required message. Thereafter, at operation 927, the source eNB 903 sends the Handover Required message to the MME 905.

Upon reception of the Handover Required message, at operation 929, the MME 905 determines whether the UE 901 is a member of the target cell 907. Upon determining that the UE 901 is not a member of the target cell, at operation 933, the MME 905 sends a Handover Reject message to the source eNB 903. Upon determining that the UE 901 is a member of the target cell, at operation 931, the MME 905 sends a Handover Request message for UE handover to the target cell (through the target MME).

Figure 10:
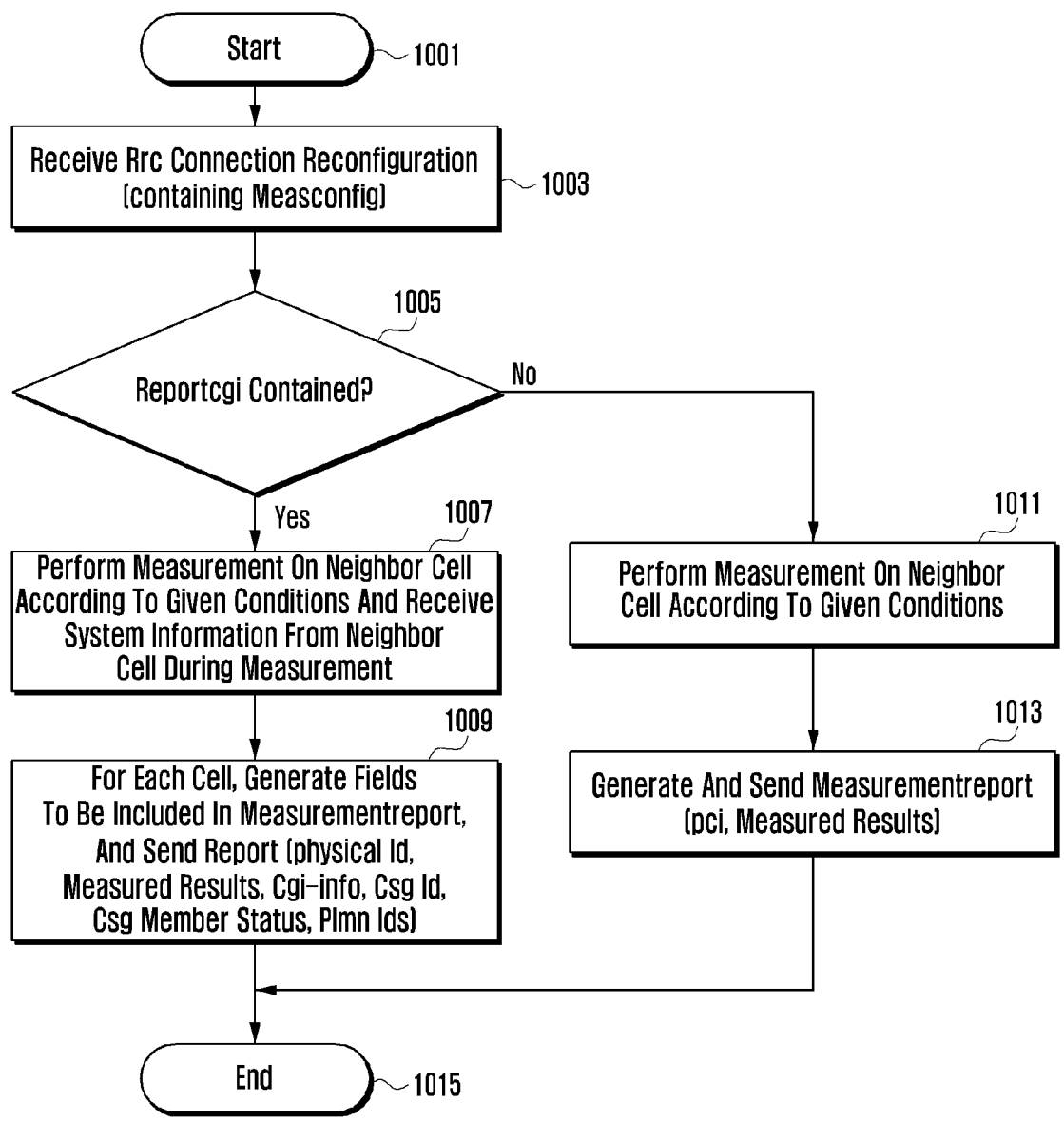
FIG. 10 is a flowchart of a procedure performed by a user equipment for handover to a shared CSG cell according to the present disclosure.

FIG. 10 is a flowchart of a procedure performed by a user equipment for handover to a shared CSG cell according to the present disclosure.

At operation 1003, the UE receives an RRC connection reconfiguration message containing a measurement configuration from the eNB. At operation 1005, the UE checks whether a CGI report command is contained in the RRC connection reconfiguration message.

If a CGI report command is not contained, the UE proceeds to operation 1011 at which the UE perform measurement on PCIs of neighbor cells according to configured conditions. At operation 1013, the UE sends a measurement report containing measurement results to the eNB. Here, the measurement report may contain measured PCIs and associated measurement results.

If a CGI report command is contained, the UE proceeds to operation 1007 at which the UE performs measurement on physical signal strength and quality of each neighbor cell and receives system information from the neighbor cell. At operation 1009, the UE creates a measurement report for each cell according to the cell type and sends the measurement report to the eNB. Such a measurement report may contain information described below according to the cell type.

for a non-CSG cell, PCI and CGI information of the cell
        may be contained in the measurement report
        the CGI information may include ECGI and TAC.
    for a non-shared CSG cell, PCI, CGI and CSG information
        of the cell may be contained in the measurement report
        the CSG information may include CSG ID and CSG member indication.
    for a shared CSG cell, not only PCI, CGI and CSG information of the cell but also a PLMN ID selected by the UE may be contained in the measurement report according to the proposal of the present disclosure After sending the measurement report, the UE may receive a command from the eNB.

Figure 11:
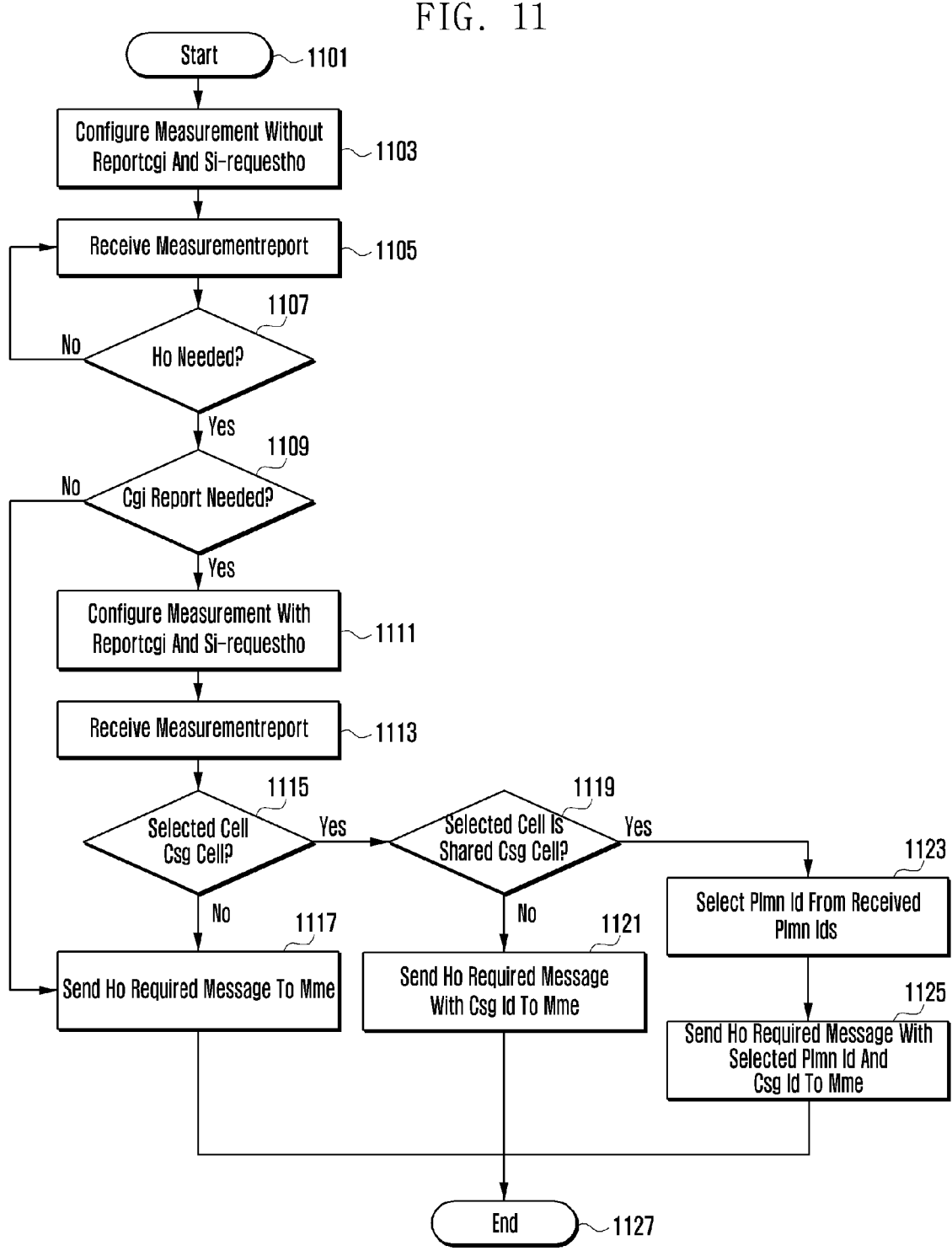
FIG. 11 is a flowchart of a procedure performed by a base station for handover to a shared CSG cell according to the present disclosure.

FIG. 11 is a flowchart of a procedure performed by a base station for handover to a shared CSG cell according to the present disclosure.

At operation 1103, the eNB sends a measurement configuration without CGI reporting to the UE. Here, the measurement configuration is delivered through an RRC connection reconfiguration message. The measurement configuration may specify frequencies to be measured, measurement conditions, and reporting schemes.

Thereafter, at operation 1105, the eNB receives a measurement report from the UE.

At operation 1107, the eNB checks necessity of UE handover on the basis of the received measurement results. If UE handover is needed, the eNB proceeds to operation 1109 at which the eNB checks whether a CGI report is additionally needed because the measured cell is a CSG cell. If a CGI report is additionally needed, the eNB proceeds to operation 1111 at which the eNB sends a measurement configuration with reportCGI and si-RequestHO fields to the UE. Here, the measurement configuration is also delivered through an RRC connection reconfiguration message. Thereafter, at operation 1113, the eNB receives a measurement report from the UE. Here, the measurement report contains not only PCI, CGI and CSG information per cell and associated measurement results but also a PLMN ID list as proposed in the present disclosure.

At operation 1115, the eNB checks whether the target cell among measured cells is a CSG cell. If the target cell is a CSG cell, the eNB proceeds to operation 1119 at which the eNB checks whether the target cell is a CSG cell shared by multiple operators.

If the target cell is not a CSG cell at operation 1115, the eNB proceeds to operation 1117 at which the eNB sends a Handover Required message containing CGI information of the target cell to the MME.

If the target cell is a CSG cell not shared by multiple operators at operation 1119, the eNB proceeds to operation 1121 at which the eNB sends a Handover Required message containing CGI and CSG ID information to the MME.

If the target cell is a CSG cell shared by multiple operators and a PLMN ID list is received from the UE, the eNB proceeds to operation 1123 at which the eNB selects one PLMN ID from the PLMN ID list. At operation 1125, the eNB sends a Handover Required message containing the selected PLMN ID and CSG ID information to the MME.

Figure 12:
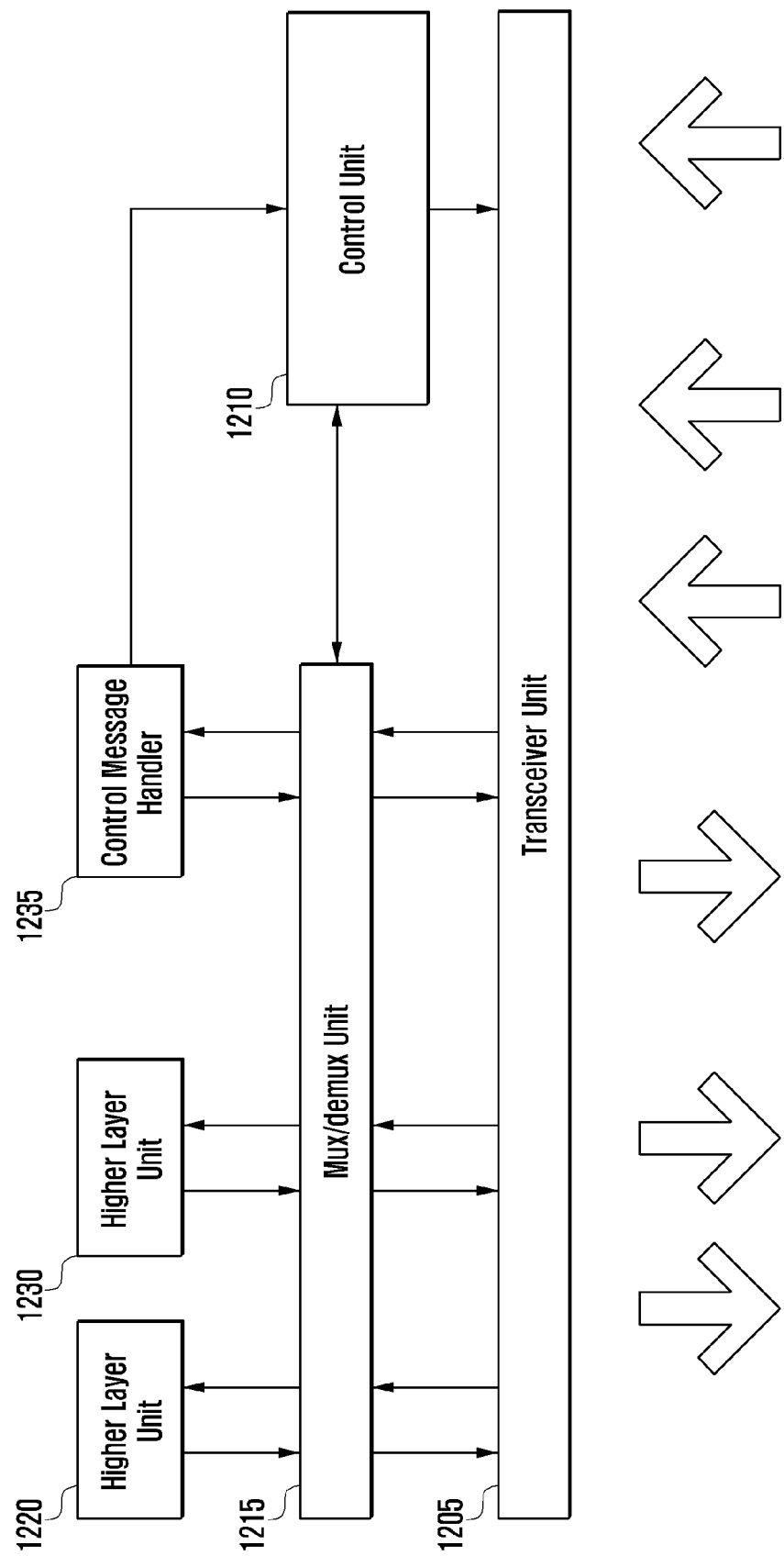
FIG. 12 is a block diagram of a user equipment according to an embodiment of the present disclosure.

FIG. 12 is a block diagram of a user equipment according to an embodiment of the present disclosure.

Referring to FIG. 12, the user equipment may include a transceiver unit 1205, a control unit 1210, a mux/demux unit 1215, a control message handler 1230, and various higher layer units 1220 and 1225.

The transceiver unit 1205 receives data and control signals through downlink channels of a serving cell and sends data and control signals through uplink channels. When multiple serving cells are configured, the transceiver unit 1205 may send and receive data and control signals through the multiple serving cells.

The mux/demux unit 1215 multiplexes data coming from the higher layer units 1220 and 1225 or the control message handler 1230, and demultiplexes data received by the transceiver unit 1205 and forwards the demultiplexed data to the higher layer units 1220 and 1225 or the control message handler 1230.

The control message handler 1230 processes a control message received from a base station and performs a corresponding operation. For example, when DRX related parameters are received, the control message handler 1230 forwards the same to the control unit 1210.

The higher layer units 1220 and 1225 may be configured on a service basis. The higher layer units 1220 and 1225 may process user data generated by service applications such as File Transfer Protocol (FTP) and Voice over Internet Protocol (VoIP) and forward the processed user data to the mux/demux unit 1215, and delivers data coming from the mux/demux unit 1215 to appropriate service applications at the higher layer.

The control unit 1210 examines scheduling commands such as uplink grants received through the transceiver unit 1205, and controls the transceiver unit 1205 and the mux/demux unit 1215 so that uplink transmissions are performed at proper timings with appropriate transmission resources. The control unit 1210 controls the transceiver unit 1205 for DRX operation and CSI/SRS transmission.

Particularly, in one embodiment, when an RRC connection reconfiguration message is received from the source cell, the control unit 1210 of the user equipment checks whether the full configuration option is configured in the received RRC connection reconfiguration message. If the full configuration option is configured, the control unit 1210 stores the current value of a given parameter used in connection with the source cell and resets the parameter. The control unit 1210 controls an operation to perform encryption and integrity verification using the reset parameter.

If the full configuration option is not configured, the control unit 1210 checks whether a stored parameter value is present. If a stored parameter value is present, the control unit 1210 resets the parameter to the stored value and discards the stored parameter value. If a stored parameter value is not present, the control unit 1210 maintains the parameter used in connection with the source cell.

Here, the parameter may be the COUNT used as input for encryption and integrity verification. The COUNT value corresponds to the value of Hyper Frame Number (HFN) combined with Packet Data Convergence Protocol Sequence Number (PDCP SN).

Figure 13:
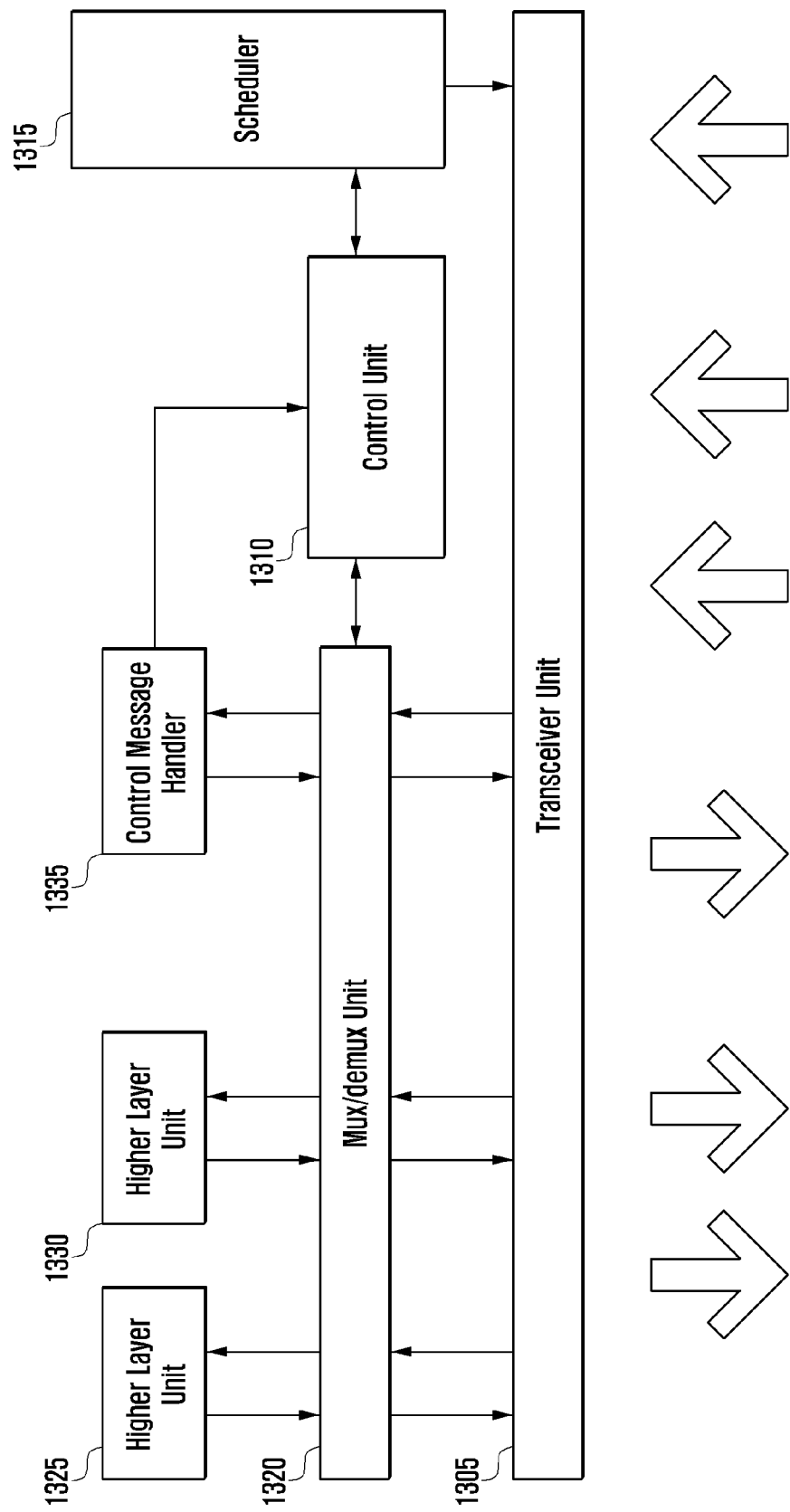
FIG. 13 is a block diagram of a base station according to an embodiment of the present disclosure.

FIG. 13 is a block diagram of a base station according to an embodiment of the present disclosure. The base station of FIG. 13 may include a transceiver unit 1305, a control unit 1310, a mux/demux unit 1320, a control message handler 1335, various higher layer units 1325 and 1330, and a scheduler 1315.

The transceiver unit 1305 sends data and control signals through a downlink carrier and receives data and control signals through an uplink carrier. When multiple carriers are configured, the transceiver unit 1305 may send and receive data and control signals through the multiple carriers.

The mux/demux unit 1320 multiplexes data coming from the higher layer units 1325 and 1330 or the control message handler 1335, and demultiplexes data received by the transceiver unit 1305 and forwards the demultiplexed data to the higher layer units 1325 and 1330, the control message handler 1335 or the control unit 1310. The control message handler 1335 processes a control message received from a user equipment and performs a corresponding operation, and generates a control message to be sent to a user equipment and forwards the control message to a lower layer.

The higher layer units 1325 and 1330 may be configured on a terminal and service basis. The higher layer units 1325 and 1330 may process user data generated by service applications such as FTP and VoIP and forward the processed user data to the mux/demux unit 1320, and process data coming from the mux/demux unit 1320 and deliver the processed data to service applications at the higher layer.

The control unit 1310 determines CSI/SRS transmission times of user equipments and controls the transceiver unit 1305 accordingly.

The scheduler 1315 allocates transmission resources to a user equipment at appropriate points in time in consideration of buffer states, channel states and active time of the user equipment, and controls the transceiver unit 1305 to send or receive a signal to or from the user equipment.

By use of the proposed method, a user equipment and base station may perform communication without a malfunction after handover failure. For handover from a macro cell to a CSG cell shared by multiple operators, it is possible for a user equipment to perform handover to an accessible cell.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

The invention claimed is:

1. A method of handover control by a user equipment in a wireless communication system, the method comprising:
receiving a radio resource control (RRC) connection reconfiguration message from a source cell;
determining whether a full configuration option is configured in the received RRC connection reconfiguration message;
if the full configuration option is determined to be configured in the received RRC connection reconfiguration message:
storing a current value of a parameter used in a connection with the source cell, and
resetting the current value of the parameter; and
performing an encryption and integrity verification using the reset value of the parameter.

2. The method of claim 1, further comprising:
checking, if the full configuration option is determined not to be configured in the received RRC connection reconfiguration message, whether a stored value of the parameter is available,
setting, if the stored value of the parameter is available, the current value of the parameter to the stored value of the parameter, and
discarding the stored value of the parameter.

3. The method of claim 2, further comprising:
maintaining, if the stored value of the parameter is not available, the current value of the parameter used in the connection with the source cell.

4. The method of claim 1, wherein the parameter is a COUNT used as an input for the encryption and integrity verification.

5. The method of claim 4, wherein a value of the COUNT corresponds to a value of a hyper frame number (HFN) combined with a value of a packet data convergence protocol sequence number (PDCP SN).

6. A user equipment supporting handover control in a wireless communication system, the user equipment comprising:
a transceiver configured to:
send signals to a source cell and a target cell, and
receive signals from the source cell and the target cell; and
a controller configured to:
control the transceiver to receive a radio resource control (RRC) connection reconfiguration message from the source cell,
determine whether a full configuration option is configured in the received RRC connection reconfiguration message,
if the full configuration option is determined to be configured in the received RRC connection reconfiguration message, store a current value of a parameter used in a connection with the source cell and reset the current value of the parameter, and
perform an encryption and integrity verification using the reset value of the parameter.

7. The user equipment of claim 6, wherein, if the full configuration option is determined not to be configured in the received RRC connection reconfiguration message, the controller is further configured to:
check whether a stored value of the parameter is available,
set, if the stored value of the parameter is available, the current value of the parameter to the stored value of the parameter, and
discard the stored value of the parameter.

8. The user equipment of claim 7, wherein, if the stored value of the parameter is not available, the controller is further configured to maintain the current value of the parameter used in the connection with the source cell.

9. The user equipment of claim 6, wherein the parameter is a COUNT used as an input for the encryption and integrity verification.

10. The user equipment of claim 9, wherein a value of the COUNT corresponds to a value of a hyper frame number (HFN) combined with a value of a packet data convergence protocol sequence number (PDCP SN).

* * * * *